(12) United States Patent
Hart et al.

(10) Patent No.: US 8,631,498 B1
(45) Date of Patent: Jan. 14, 2014

(54) TECHNIQUES FOR IDENTIFYING POTENTIAL MALWARE DOMAIN NAMES

(75) Inventors: Michael Andrew Hart, Mountain View, CA (US); Jeffrey Scott Wilhelm, Venice, CA (US); Sharada Sundaram, Mountain View (IN)

(73) Assignee: Symantec Corporation, Mountain View, CA (US)

( * ) Notice: Subject to any disclaimer, the term of this patent is extended or adjusted under 35 U.S.C. 154(b) by 83 days.

(21) Appl. No.: 13/336,730

(22) Filed: Dec. 23, 2011

(51) Int. Cl.
*H04L 29/06* (2006.01)
(52) U.S. Cl.
USPC .............................................. 726/25; 726/22
(58) Field of Classification Search
USPC .................................................... 726/25, 22
See application file for complete search history.

(56) References Cited

U.S. PATENT DOCUMENTS

| | | | | |
|---|---|---|---|---|
| 2003/0204569 | A1* | 10/2003 | Andrews et al. | 709/206 |
| 2011/0083180 | A1* | 4/2011 | Mashevsky et al. | 726/23 |
| 2012/0110672 | A1* | 5/2012 | Judge et al. | 726/25 |
| 2012/0158626 | A1* | 6/2012 | Zhu et al. | 706/13 |

OTHER PUBLICATIONS

Ma, Justin, et al. "Beyond blacklists: learning to detect malicious web sites from suspicious URLs." Proceedings of the 15th ACM SIGKDD international conference on Knowledge discovery and data mining. ACM, 2009.*

* cited by examiner

*Primary Examiner* — Kambiz Zand
*Assistant Examiner* — Michael Guirguis
(74) *Attorney, Agent, or Firm* — Wilmer Cutler Pickering Hale and Dorr LLP

(57) ABSTRACT

Techniques for identifying potential malware domain names are disclosed. In one particular exemplary embodiment, the techniques may be realized as a system for identifying potential malware domain names. The system may comprise one or more processors communicatively coupled to a network. The one or more processors may be configured to receive a request for network data, where the request for network data may comprise a domain name. The one or more processors may also be configured to apply a lexical and linguistic analysis to the domain name. The one or more processors may also be configured to identify whether the domain name is a potential malware domain name based on the lexical and linguistic analysis.

20 Claims, 4 Drawing Sheets

TECHNIQUES FOR IDENTIFYING POTENTIAL MALWARE DOMAIN NAMES

FIELD OF THE DISCLOSURE

The present disclosure relates generally to network monitoring and, more particularly, to techniques for identifying potential malware domain names.

BACKGROUND OF THE DISCLOSURE

Malware applications are prevalent. Indeed, malware applications may come in a variety of forms and may introduce viruses, steal account information, charge subscription fees while providing no value, and perform other malicious actions. Malware applications are generally associated with potential malware domain names. For example, domain name "ivklhvfyyvf.org" may represent a potential malware domain name since such a domain name, with such an anomalous sequence of alphanumeric characters, would be an unlikely destination for a web surfer. Many malware distribution sites may use such fabricated domain names to spread malware applications to unsuspecting users. However, using conventional computer security techniques to detect potential malware domain names may be limited, time-consuming, and resource-intensive.

In view of the foregoing, it may be understood that there may be significant problems and shortcomings associated with conventional malware domain name identification technologies.

SUMMARY OF THE DISCLOSURE

Techniques for identifying potential malware domain names are disclosed. In one particular exemplary embodiment, the techniques may be realized as a system for identifying potential malware domain names. The system may comprise one or more processors communicatively coupled to a network. The one or more processors may be configured to receive a request for network data, where the request for network data may comprise a domain name. The one or more processors may also be configured to apply a lexical and linguistic analysis to the domain name. The one or more processors may also be configured to identify whether the domain name is a potential malware domain name based on the lexical and linguistic analysis.

In accordance with other aspects of this particular exemplary embodiment, the domain name may comprise a Uniform Resource Locator (URL).

In accordance with further aspects of this particular exemplary embodiment, the lexical and linguistic analysis may comprise analyzing lexical features of the domain name, the lexical features comprising at least one of the following: hyphen count; keyword count; character length; word-to-digit ratio; top level domain or domain origination; and predetermined suspicious alphanumeric character sequences.

In accordance with additional aspects of this particular exemplary embodiment, the lexical and linguistic analysis may comprise a keyword analysis based on separating the domain name into constituent keywords or sub-keywords.

In accordance with other aspects of this particular exemplary embodiment, the lexical and linguistic analysis may comprise a phonetic analysis based on at least one of a pronunciation dictionary and a number of phenomes identified in the domain name.

In accordance with further aspects of this particular exemplary embodiment, the lexical and linguistic analysis may comprise a language model analysis based on applying N-gram statistical analysis to an actual native language of the domain name and actual visitor. In some embodiments, the N-gram may be a trigram.

In accordance with additional aspects of this particular exemplary embodiment, the statistical analysis may yield a probability value that indicates the probability that the domain name is a potential malware domain name.

In accordance with other aspects of this particular exemplary embodiment, the one or more processors, in the event the domain name is identified as a potential malware domain name, may be further configured to perform at least one of the following: deny the request for network data; transmit a notification that the domain name is a potential malware domain name; request authorization to request network data, add to a malware domain blacklist; and build a classifier configured to provide fine-tuned identification of potential malware domain names.

In another particular exemplary embodiment, the techniques may be realized as a method for identifying potential malware domain names. The method may comprise receiving, at a potential malware domain identification module, a request for network data, where the request for network data comprises a domain name. The method may also comprise applying a lexical and linguistic analysis to the domain name. The method may further comprise identifying whether the domain name is a potential malware domain name based on the lexical and linguistic analysis.

In another particular exemplary embodiment, the techniques may be realized as an article of manufacture for identifying potential malware domain names. The article of manufacture may comprise at least one non-transitory processor readable storage medium and instructions stored on the at least one medium. The instructions may be configured to be readable from the at least one medium by at least one processor and thereby cause the at least one processor to operate so as to: receive, at a potential malware domain identification module, a request for network data, wherein the request for network data comprises a domain name; apply a lexical and linguistic analysis to the domain name; and identify whether the domain name is a potential malware domain name based on the lexical and linguistic analysis.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
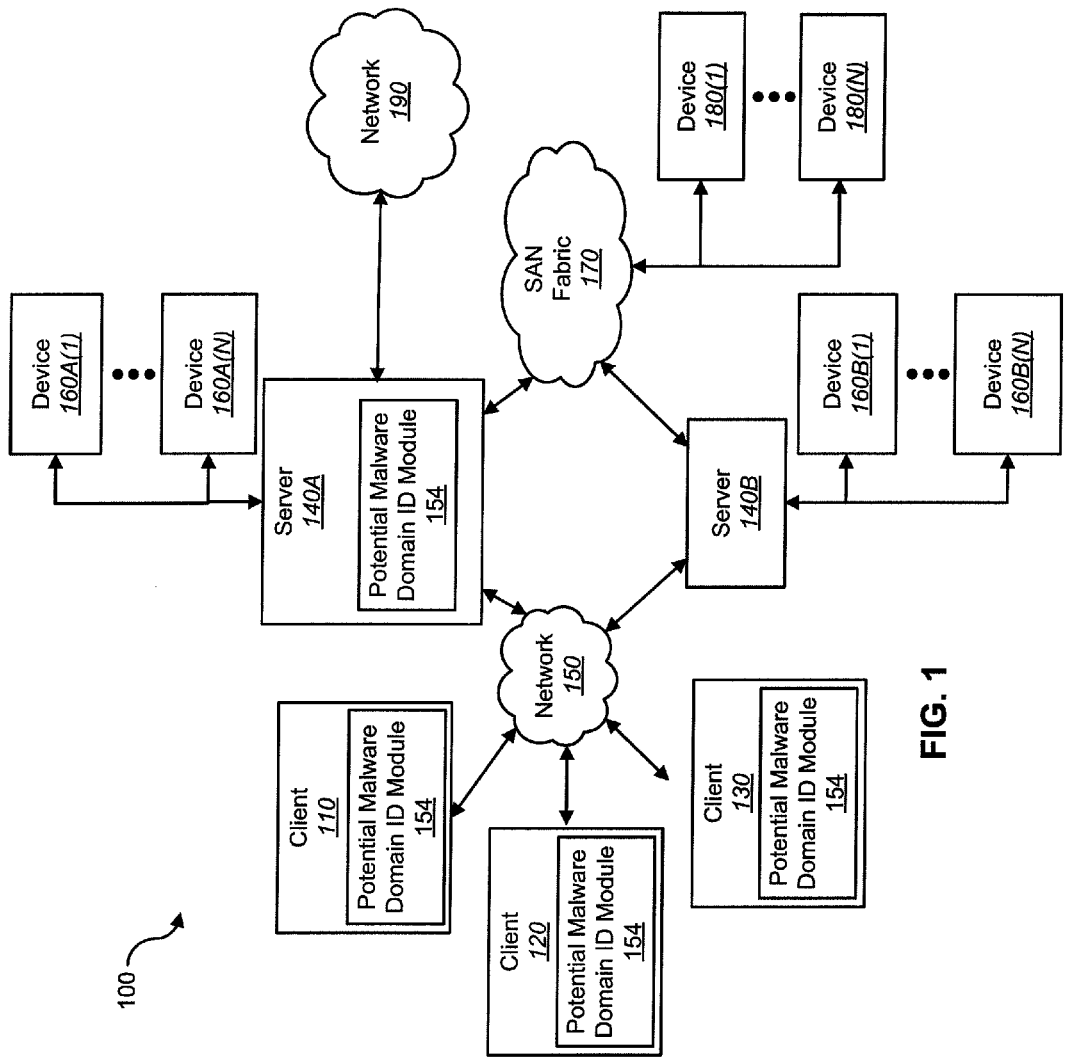
FIG. 1 shows a block diagram depicting a network architecture for identifying potential malware domain names in accordance with an embodiment of the present disclosure.

FIG. 1 shows a block diagram depicting a network architecture 100 for identifying potential malware domain names in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may contain a management module (e.g., potential malware domain identification module 154 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
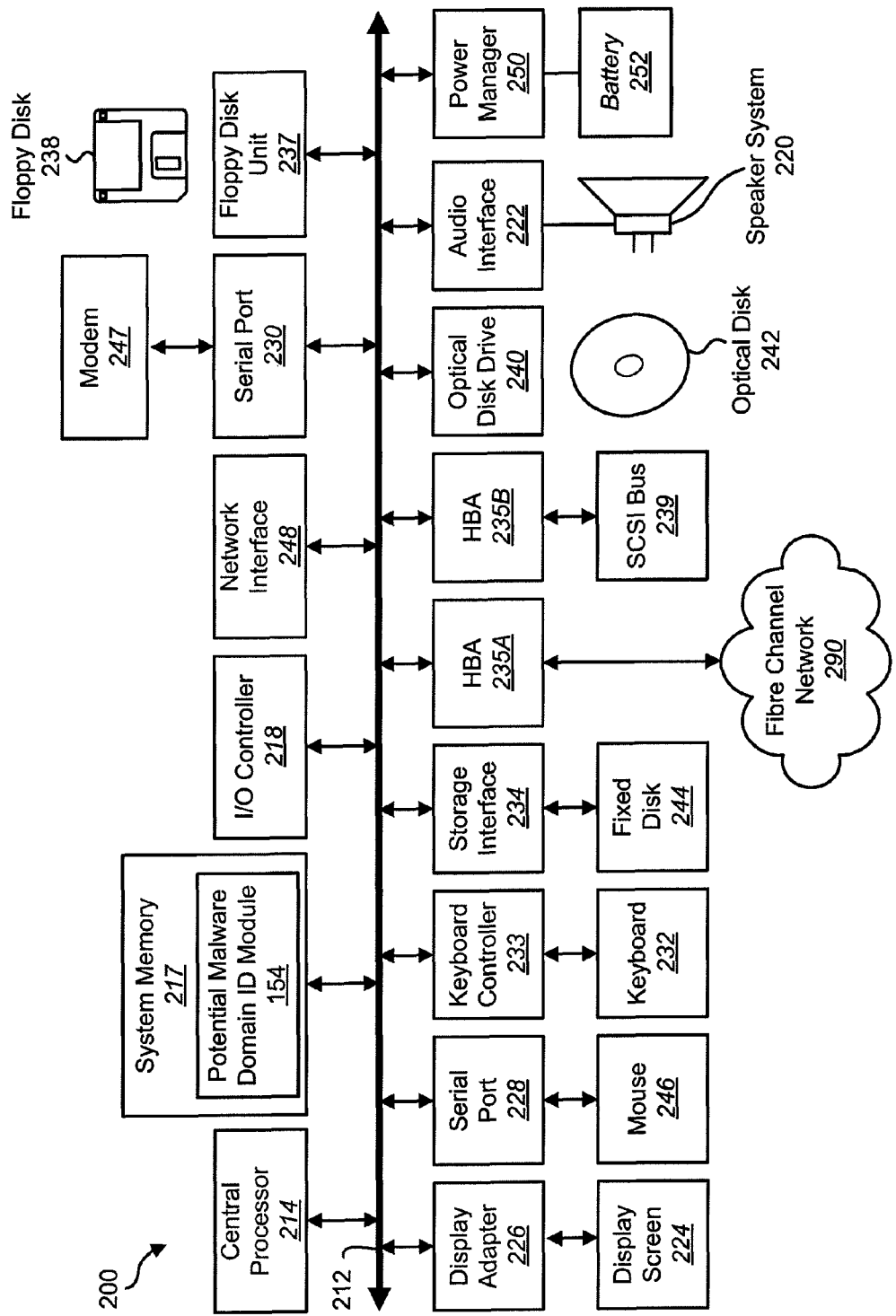
FIG. 2 depicts a block diagram of a computer system for identifying potential malware domain names in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may be able to access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, clients 110, 120, and 130 may be smartphones, PDAs, desktop computers, a laptop computers, servers, other computers, or other devices coupled via a wireless or wired connection to network 150. Clients 110, 120, and 130 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and/or 130 may contain one or more portions of software for identification of potential malware domain names such as, for example, potential malware domain identification module 154. As illustrated, one or more portions of potential malware domain identification module 154 may reside at a network centric location. For example, server 140A may be a server, a firewall, a gateway, or other network element that may perform one or more actions to identify a potential malware domain. According to some embodiments, network 190 may be an external network (e.g., the Internet) and server 140A may be a gateway or firewall between one or more internal components and clients and the external network.

Potential malware domain identification module 154 may identify potential malware domain names, which may be directed to one or more malware applications. For example, these malware applications may include a fake anti-virus software product, a fake network security software product, a fake anti-spyware software product, a fake computer disk optimization software product, a fake operating system update software product, a fake operating system registry tool software product, and/or a fake computer optimization software product.

As discussed above, conventional computer security techniques for identifying potential malware domain names may be limited, time-consuming, and resource-intensive. For example, some conventional techniques may be directed to analyzing traffic patterns or observing types of files downloaded from various domain names. These techniques, however, may take large quantities of time and resources. Network analysis may take weeks to identify potential malware domain names, which is not quick enough to respond to certain malware distribution sites that may only exist for a few hours. Analyzing malware may be limited to current known definitions, which again, may lead to potential lag time in response to potential malware domain names, not previously known. Based on an analysis of domain name blacklists, it should be appreciated that many potential malware domain names are fabricated, such as "ivklhvfyyvf.org" or an unimaginative "777777.ru."

Potential malware domain identification module 154 may identify a potential malware domain name based on a variety of techniques. Heuristics may indicate that a domain name have a lower likelihood of being a potential malware domain name when the domain name is shorter, pronounceable, memorable, recognizable, and/or avoid numbers. Furthermore, a domain name that is based on a known native language or actual visitor may typically reduce the risk of being a potential malware domain name as well. Thus, in general, if a domain name does not follow heuristics and/or a particular native language and actual visitor, then the domain name may be identified as suspicious or as a potential malware domain name.

Accordingly, potential malware domain identification module 154 may use lexical analysis and/or linguistic features to identify potential malware domains.

For lexical analysis, a variety of lexical features of a domain name may be analyzed. These lexical features may include whether the domain name starts/ends with a number, word-to-digit ratio, hyphen count, and/or character length. Malware domains may also employ long domains constructed from keywords and hyphens, which may be easily routed for disposal.

Suspicious alphanumeric character sets (e.g., "00," "vv," "4," "1," "0," etc.) may also raise flags to potential malware domains since there may be an expectation that legitimate domains minimally use numbers in their domain names. For example, if the domain contains certain numbers such as "0" and "1," or if the domain begins or ends with digits and/or if the domain contains a year, the domain may have greater potential to be a malware domain. It should also be appreciated that certain alphanumeric character sequences may also be indicators of suspicious domains since domains including these sequences may be used as to appear as a legitimate character sequence. For instance, "vv" may be used to appear as "w" or "4" may be used to substitute as "for" in a domain name. Therefore, a potential malware domain "vvellsfago.com" may be used to confuse legitimate domain "wellsfargo.com." Other patterns and/or character sequences may be used in the lexical analysis.

The origination of a top level domain may also be used to identify potential malware domains. For example, knowing where the domain name originates may be a powerful tool for detection since it may be generally unlikely that the majority of North American web surfers would download software from .tk, .in, and/or .cn domains.

In additional to lexical analysis, potential malware domain identification module 154 may also utilize linguistic features to identify potential malware domains. These linguistic features may include keyword analysis, phonetic analysis, and/or language modeling.

Keyword analysis may take and separate a top level domain, for example, into a set of constituent keywords and/or sub-keywords. For example, under this approach "facebook.com" may become "face book" for the purposes of analysis, and potential malware domain identification module 154 may then be able to determine whether the domain name is a potential malware domain based on constituent keywords or sub-keywords.

A keyword count may be performed. The keyword count may be two for "facebook" and ten for "ivklhvfyyvf." Potential malware domains may tend to have more keywords than lower risk or legitimate domains.

A large dictionary of English words with their corresponding pronunciations to search the domain name for the keywords that most likely comprise the domain name may also be used. This may be analogous to considering that a long domain name is actually a phrase or sentence and analyzing the long domain accordingly.

Other keyword analysis may include using a sample of known malware sites to identify keywords that are more common in malware sites. This analysis may be achieved using a chi-squared (X2) test, where for each keyword, a statistically significant correlation may be determined between a word "w" and malware domains by comparing two variables: if domain is a malware domain and if domain contains word "w." A number of these keywords extracted from the domain name may be counted.

It should be appreciated that a chi-squared (X2) test may any statistical hypothesis test where a sampling distribution of the test statistic is a chi-squared distribution when null hypothesis is true, or any in which this is asymptotically true, meaning that the sampling distribution (if the null hypothesis is true) may be made to approximate a chi-squared distribution as closely as desired by making the sample size large enough. Examples of chi-squared tests may include: Pearson's chi-squared test, Yates' correction for continuity, Cochran-Mantel-Haenszel chi-squared test, linear-by-linear association chi-squared test, portnateau test in time-series analysis, and/or likelihood-ratio tests.

In phonetic analysis, a pronouncing dictionary may be used and an entire number of phonemes across all keywords may be summed up. A phoneme may be a smallest segmental unit of sound employed to form meaningful contrasts between utterances. Thus, for "facebook" (from facebook.com) there may be six phonemes whereas "ivklhvfyyvf" (from ivklhvfyyvf.com) may generate twenty-one phonemes. Similar to keyword count described above, lower risk domains may have fewer phonemes and malware domains may have more phonemes. This may lend credence to the fact that good domain names should be easy to remember and pronounceable.

In language modeling, expectation that legitimate websites have memorable domain names, such as facebook.com, google.com or bing.com, may be used. For example, domain names may be composed of words and phrases without whitespace that are common in the language spoken by the web surfer. Language models based on a user's native language may be used to sample representative texts and representing them as three-character sequences (known as trigrams). An N-gram may be a contiguous sequence of N items from a given sequence of text or speech for predicting the next item in such a sequence in the form of a (n−1)-order Markov model used in probability, communication theory, computational linguistics, etc. A trigram may be a special case of the N-gram, where N is 3. Accordingly, trigrams may be used in natural language processing for performing statistical analysis of texts, in this case domain names.

Therefore, the keyword "Cat," under the language model analysis, may be represented as the sequence "$$C," "$Ca," "Cat." A likelihood or probability of this sample of text being generated by the language model (e.g., English) may be determined. Here, the probability of the language model generated for facebook.com may be greater than the probability for ivklhvfyyvf.org, thereby identifying ivklhvfyyvf.org as a greater malware domain risk.

Language modeling may be built on sampled legitimate domain names. For example, these legitimate domains may be built from various sources, such as Alexa, Download.com, FileHippo, Wikipedia, etc. Use of the log (probability) of the language model may also be used as a feature to identify potential malware domains.

Similar to trigrams, there may be some utility from analyzing keywords in this manner as well.

It should be appreciated machine learning may be used as well. For example, machine learning may be used to help build a classifier in order to perform and fine-tune potential malware domain name detection in potential malware domain identification module 154.

By using potential malware domain identification module 154, a number of advantages may be realized. Current techniques for malware detection may require extensive effort. For example, many approaches may require deployment of sensors, constant monitoring, and expert analysis to generate rules. These techniques may require substantial overhead. Techniques according to various embodiments of this disclosure may utilize far less resources to train and deploy. Furthermore, potential malware domain identification module 154 may provide immediate benefit since new potential malware domains may be more readily identified. Ultimately, the techniques presented may provide greater efficiency, lower cost, and greater reliability in identifying potential malware domain names when compared to traditional methods and techniques.

FIG. 2 depicts a block diagram of a computer system for identifying potential malware domain names in accordance with an embodiment of the present disclosure. Computer system 200 is suitable for implementing techniques in accordance with the present disclosure. Computer system 200 may include a bus 212 which may interconnect major subsystems of computer system 210, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM is may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, potential malware domain identification module 154 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
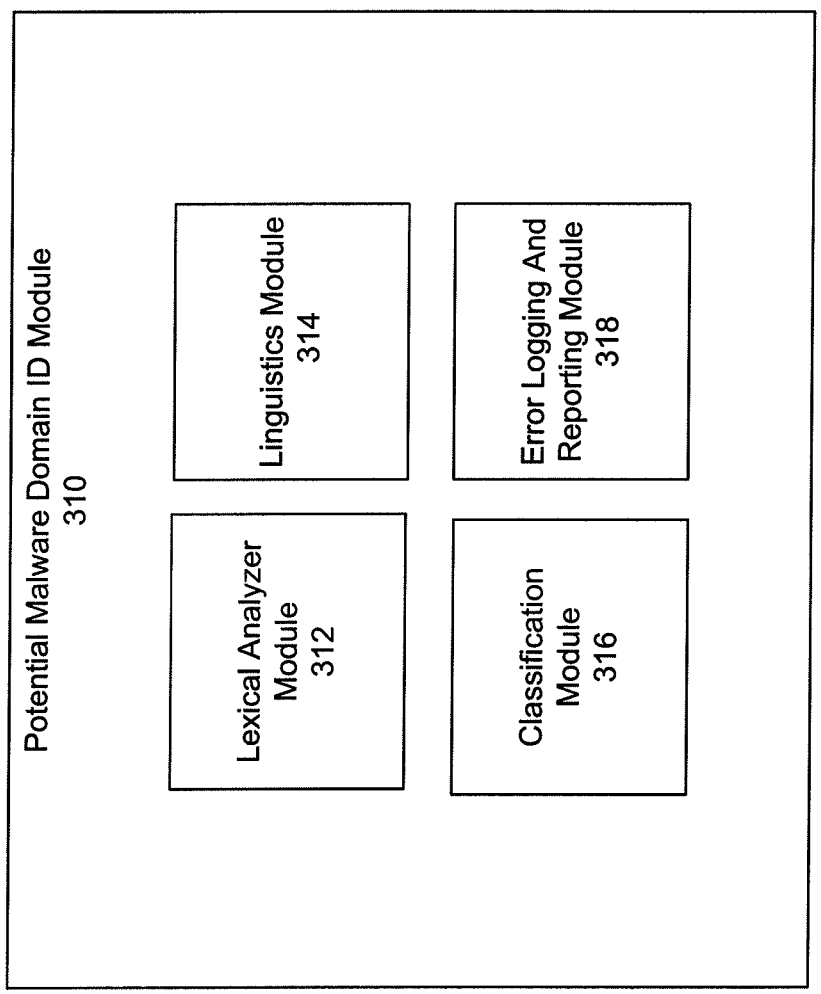
FIG. 3 shows a module for identifying potential malware domain names in accordance with an embodiment of the present disclosure.

FIG. 3 shows a module for identifying potential malware domain names in accordance with an embodiment of the present disclosure. Referring to FIG. 3, there is shown a potential malware domain identification module 310 in accordance with an embodiment of the present disclosure. As illustrated, the potential malware domain identification module 310 may contain one or more components including lexical analyzer module 312, linguistics module 314, classification module 316, and error logging and reporting module 318.

The description below describes network elements, computers, and/or components of a system and method for identifying potential malware domain names that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Lexical analyzer module 312 may be used to perform various lexical analysis features. Linguistics module 314 may be used to analyze various linguistic features of domain names. Classification module 316 may use machine learning to generate and fine-tune identification and classification of domain names.

Error logging and reporting module 318 may produce logs, reports, or other information associated with identifying potential malware domain names.

Figure 4:
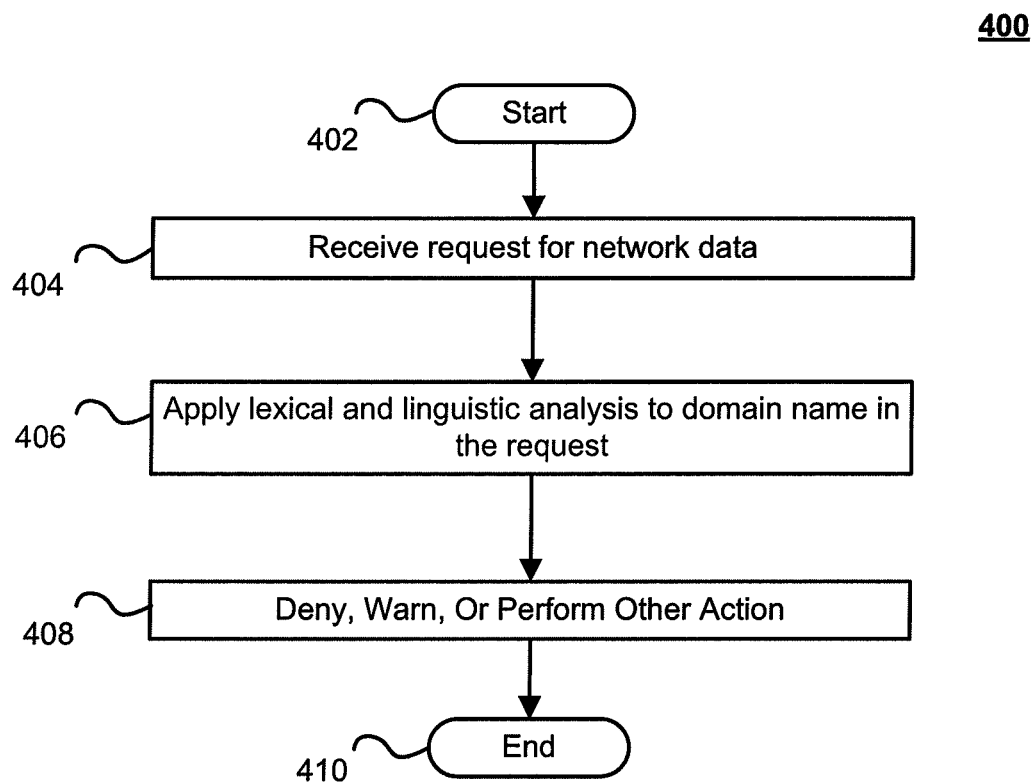
FIG. 4 depicts a flowchart of a method for identifying potential malware domain names in accordance with an embodiment of the present disclosure.

FIG. 4 depicts a flowchart of a method for identifying potential malware domain names in accordance with an embodiment of the present disclosure. The exemplary method 400 is provided by way of example, as there are a variety of ways to carry out methods disclosed herein. The method 400 shown in FIG. 4 may be executed or otherwise performed by one or a combination of various systems. The method 400 is described below as carried out by at least system 100 in FIG. 1, architecture 200 in FIG. 2, and module 310 in FIG. 3, by way of example, and various elements of system 100 are referenced in explaining the exemplary method of FIG. 4. Each block shown in FIG. 4 represents one or more processes, methods, or subroutines carried in the exemplary method 400. A non-transitory computer-readable medium comprising code, which when performed by a computer, may perform the acts of the method 400 may also be provided. Referring to FIG. 4, the exemplary method 400 may begin at block 402.

At block 402, the method 400 may begin.

At block 404, a request for network data may be received. The request for network data may include a domain name.

At block 406, one or more lexical and linguistic analysis of the domain name may be applied to determine if the domain name is a potential malware domain name.

It should be appreciated that several iterations or additional analysis may be performed on the domain name if the domain does not initially appear to be a potential malware domain. In the event the one or more lexical and linguistic analysis indicates that the risk of the domain name being a potential malware domain is low, no additional analysis may be performed. If the domain name contains questionable indicators, based on the one or more lexical and linguistic analysis, showing that the domain may be a potential malware domain, additional actions may be taken.

At block 408, in the event that the domain name is identified as a potential malware domain name based on the at least one or more lexical and linguistic analysis, network access may be denied, a warning or notification may be transmitted (e.g., to indicate potential risk or request verification/authorization of the domain name), and/or other action may be performed. For example, the domain name may be used to update a blacklist of malware domains, may be used to build the classification module 316 via machine learning, or may restart at block 402, and/or move forward to terminate the method, etc.

At block 410, the method 400 may end.

At this point it should be noted that identifying potential malware domain names in accordance with the present disclosure as described above typically involves the processing of input data and the generation of output data to some extent. This input data processing and output data generation may be implemented in hardware or software. For example, specific electronic components may be employed in a potential malware domain names identification module or similar or related circuitry for implementing the functions associated with identifying potential malware domain names in accordance with the present disclosure as described above. Alternatively, one or more processors operating in accordance with instructions may implement the functions associated with identifying potential malware domain names in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A system for identifying potential malware domain names comprising:
   one or more processors communicatively coupled to a network, wherein the one or more processors are configured to:
   receive a request for network data, wherein the request for network data comprises a domain name;
   apply a lexical and linguistic analysis to the domain name, wherein the lexical and linguistic analysis comprises machine learning configured to establish at least one classifier for performing and fine-tuning potential malware domain name detection; and
   identify whether the domain name is a potential malware domain name based on the lexical and linguistic analysis.

2. The system of claim 1, wherein the domain name comprises a Uniform Resource Locator (URL).

3. The system of claim 1, wherein the lexical and linguistic analysis comprises analyzing lexical features of the domain name, the lexical features comprising at least one of the following: hyphen count; keyword count; character length; word-to-digit ratio; top level domain or domain origination; and predetermined suspicious alphanumeric character sequences.

4. The system of claim 1, wherein the lexical and linguistic analysis comprises a keyword analysis based on separating the domain name into constituent keywords or sub-keywords.

5. The system of claim 1, wherein the lexical and linguistic analysis comprises a phonetic analysis based on at least one of a pronunciation dictionary and a number of phonemes identified in the domain name.

6. The system of claim 1, wherein the lexical and linguistic analysis comprises a language model analysis based on applying N-gram statistical analysis to an actual native language of the domain name and actual visitor.

7. The system of claim 6, wherein the N-gram is a trigram.

8. The system of claim 6, wherein the statistical analysis yields a probability value that indicates the probability that the domain name is a potential malware domain name.

9. The system of claim 1, wherein the one or more processors, in the event the domain name is identified as a potential malware domain name, are further configured to perform at least one of the following: deny the request for network data; transmit a notification that the domain name is a potential malware domain name; request authorization to request network data, add to a malware domain blacklist; and build a classifier configured to provide fine-tuned identification of potential malware domain names.

10. A method for identifying potential malware domain names comprising:
receiving, at a potential malware domain identification module, a request for network data, wherein the request for network data comprises a domain name;
applying a lexical and linguistic analysis to the domain name, wherein the lexical and linguistic analysis comprises machine learning configured to establish at least one classifier for performing and fine-tuning potential malware domain name detection; and
identifying whether the domain name is a potential malware domain name based on the lexical and linguistic analysis.

11. The method of claim 10, wherein the domain name comprises a Uniform Resource Locator (URL).

12. The method of claim 10, wherein the lexical and linguistic analysis comprises analyzing lexical features of the domain name, the lexical features comprising at least one of the following: hyphen count; keyword count; character length; word-to-digit ratio; top level domain or domain origination; and predetermined suspicious alphanumeric character sequences.

13. The method of claim 10, wherein the lexical and linguistic analysis comprises a keyword analysis based on separating the domain name into constituent keywords or sub-keywords.

14. The method of claim 10, wherein the lexical and linguistic analysis comprises a phonetic analysis based on at least one a pronunciation dictionary, and a number of phonemes identified in the domain name.

15. The method of claim 10, wherein the lexical and linguistic analysis comprises a language model analysis based on applying N-gram statistical analysis to native language of the domain name and actual visitor.

16. The method of claim 15, wherein the N-gram is a trigram.

17. The method of claim 15, wherein the statistical analysis yields a probability value that indicates the probability that the domain name is a potential malware domain name.

18. The method of claim 10, wherein the potential malware domain identification module, in the event the domain name is identified as a potential malware domain name, performs at least one of the following: deny the request for network data; transmit a notification that the domain name is a potential malware domain name; request authorization to request network data, add to a malware domain blacklist; and build a classifier configured to provide fine-tuned identification of potential malware domain names.

19. A non-transitory computer-readable storage medium storing a computer program of instructions configured to be readable by at least one computer processor for instructing the at least one computer processor to execute a computer process for performing the method of claim 10.

20. An article of manufacture for identifying potential malware domain names, the article of manufacture comprising:
at least one non-transitory processor readable storage medium; and
instructions stored on the at least one medium;
wherein the instructions are configured to be readable from the at least one medium by at least one processor and thereby cause the at least one processor to operate so as to:
receive, at a potential malware domain identification module, a request for network data, wherein the request for network data comprises a domain name;
apply a lexical and linguistic analysis to the domain name, wherein the lexical and linguistic analysis comprises machine learning configured to establish at least one classifier for performing and fine-tuning potential malware domain name detection; and
identify whether the domain name is a potential malware domain name based on the lexical and linguistic analysis.

* * * * *